A. D. KILBORN.
Oil-Cup.
No. 215,632. Patented May 20, 1879.
Fig. 1.
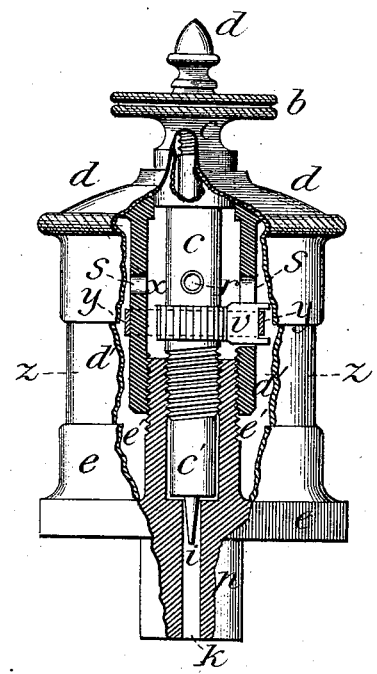
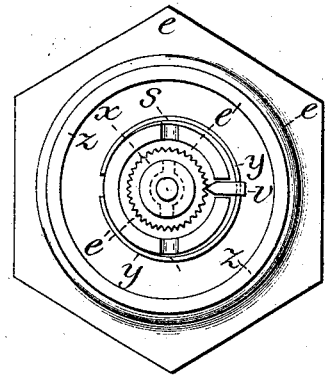
Fig. 2.
Attest:
Noble Fisher
G. V. Smith
Inventor:
Alden D. Kilborn,
per Atty—
A. G. Waterhouse

UNITED STATES PATENT OFFICE.

ALDEN D. KILBORN, OF OAKLAND, CALIFORNIA.

IMPROVEMENT IN OIL-CUPS.

Specification forming part of Letters Patent No. 215,632, dated May 20, 1879; application filed October 5, 1878.

*To all whom it may concern:*

Be it known that I, ALDEN D. KILBORN, of the city of Oakland, county of Alameda, State of California, have invented a new and useful Improvement in Oil-Cups, of which the following is a specification.

The invention relates to that class of oil-cups used for lubricating purposes where a regular flow of oil is required of any certain desired quantity; and consists of a flanged top and bottom, with an intermediate glass tube or cylinder, of other material, held together by means of hollow tubes, being connected to said top and bottom, the inside of said tube being provided with a valve-screw and click-wheel, which forms the principal element of my invention.

In the accompanying drawings, Figure 1 shows an elevation of the oil-cup with part cut away, showing the interior part embodying my invention. Fig. 2 is a transverse sectional view of the same.

In Fig. 1, $z$ shows the glass cylinder. $e$ is the flanged bottom, provided with the shank P, for connecting the cup to the bearing to be oiled. $e'$ is a hollow tube, made a part of the bottom $e$, and provided with screw-thread at its upper edge. The cap $d$ is also, like $e$, provided with a flange, that fits down over $z$. The hollow tube $d'$ is made a part of cap $d$, and provided at its lower end with an internal thread that screws over $e'$, thus drawing $e$ and $d$ together, and holding $z$ firmly in its place.

The hollow column or tube formed by $e'$ and $d'$ is made large at the upper part, or in part $d'$. The upper part of $e'$ is provided with an internal thread, and its lower part, that passes through $e'$, is also made hollow, the bore of which is smaller than the bore in $d'$, while P is provided with a small hole, K.

In the bore of $e'$ and $d'$ is inserted a valve-screw, $c$, which is provided with a thumb-disk, $b$, for turning it. A head fills the opening or bore through $d$. As shank of valve-screw $c$ extends down the bore, it is reduced in diameter, and is provided with a ratchet ring or collar, $x$, below which is an external thread, that screws into the internal thread of $e'$, said shank being continued down at $c'$, and is provided with a flat end and conical pin $i$, the object of the flat end being to form a valve, in connection with the step that is seen at the bottom of the bore in $e'$ and the top of the small hole K, so that as $c$ is turned by $b$ the threads of $c$ and $e'$ cause $c$ to move up or down, either opening or closing the oil-passages between $c'$ and $e$. The pin $i$ on the shank $c$ enters the hole K, so as to partially obstruct the passage of the oil before the end of $c'$ reaches the seat.

The ratcheted collar $x$ is acted upon by the click $v$, which is provided with a knife-edge, that enters the notches in $x$, and prevents any jar or rattle from moving valve-screw $c$. The click $v$ is inserted through an aperture in the side of tube $d'$. (See Fig. 2.) Around said tube $d'$ is a spring, $y$, that passes around $v$, causing it to click in and out of the notches in $x$ when it is turned, and holding it from moving when once it is set.

The shank of valve-screw $c$ has at its top an acorn-shaped stopper, $d$, which screws in the supply-hole. By taking $d$ out oil can be poured in the hole, which extends down through the center of $c$, and passes out through the openings of $r$, from thence into the hollow of $d'$, and out through the openings $s$ into the oil-cup.

What I claim as my improvement is—

The combination of the tube formed by $d'$ and $e'$, provided with the spring $y$ and click $v$, with the shank $c$, provided with the oil-aperture $r$, ratchet-collar $x$ and screw below, and pin $i$, substantially as and for the purposes set forth.

ALDEN D. KILBORN.

Witnesses:
NOBLE FISHER,
G. V. SMITH.